United States Patent
Hill

[15] 3,667,106
[45] June 6, 1972

[54] COLLAR SALVAGING DEVICE

[72] Inventor: George L. Hill, 717 Carby, Houston, Tex. 77037

[22] Filed: July 30, 1969

[21] Appl. No.: 856,229

[52] U.S. Cl. ............................29/240, 29/200 D, 29/427, 81/90 T
[51] Int. Cl. ........................................................B23p 19/04
[58] Field of Search ............29/237, 240, 427, 240.5, 200 D; 81/90 T

[56] References Cited

UNITED STATES PATENTS

| | | | |
|---|---|---|---|
| 245,055 | 8/1881 | Callahan | 29/237 |
| 1,232,707 | 7/1917 | Moon | 29/240 UX |
| 2,246,954 | 6/1941 | Schleinitz | 29/237 |
| 2,584,118 | 2/1952 | Forster | 29/240.5 |
| 2,686,447 | 8/1954 | Vock et al. | 29/240 X |
| 2,933,964 | 4/1960 | Wittlein | 81/90 T |
| 3,458,183 | 7/1969 | Rescigno | 29/237 X |

Primary Examiner—Charlie T. Moon
Attorney—Ranseler O. Wyatt

[57] ABSTRACT

A tool for salvaging collars from pipe having means for gripping the collar and rotating the pipe within the collar to break the connection and effect removal of the collar therefrom, including the novel process of cooling the collar while blocks are welded within the pipe and adapting the device employed for rotating the pipe to the various sizes of pipe.

3 Claims, 4 Drawing Figures

PATENTED JUN 6 1972　　　　　　　　　　　　3,667,106

George L. Hill
INVENTOR.

BY Ranseler O. Wyatt
ATTORNEY

COLLAR SALVAGING DEVICE

BACKGROUND OF THE INVENTION

It is a common practice in the oil field industry to salvage such pipe as may be possible from abandoned wells, and the like, and often when such sections of pipe are being processed for salvage, the collars mounted thereon can not be removed with tools at hand, and the pipe is then severed at the end of the collar, and the collar, with the pipe inside, called a "dutchman" is discarded as junk. Many of the collars, if they can be removed from the pipe, can be cleaned, painted and salvaged. Tools presently in use for this purpose are not successful, in many instances, in removing these collars without damaging the collar to the extent that it has no salvage value.

SUMMARY OF THE INVENTION

A method of salvaging collars from sections of pipe consisting of a welding of blocks to the inside surface of the pipe, maintaining the collar cool during said welding, placing the pipe on a mandrel, inserting a tongue into a slot in the mandrel to be brought into engagement with said blocks, and rotating the mandrel while the collar is maintained against rotation.

DESCRIPTION OF THE PREFERRED EMBODIMENT

Figure 1:
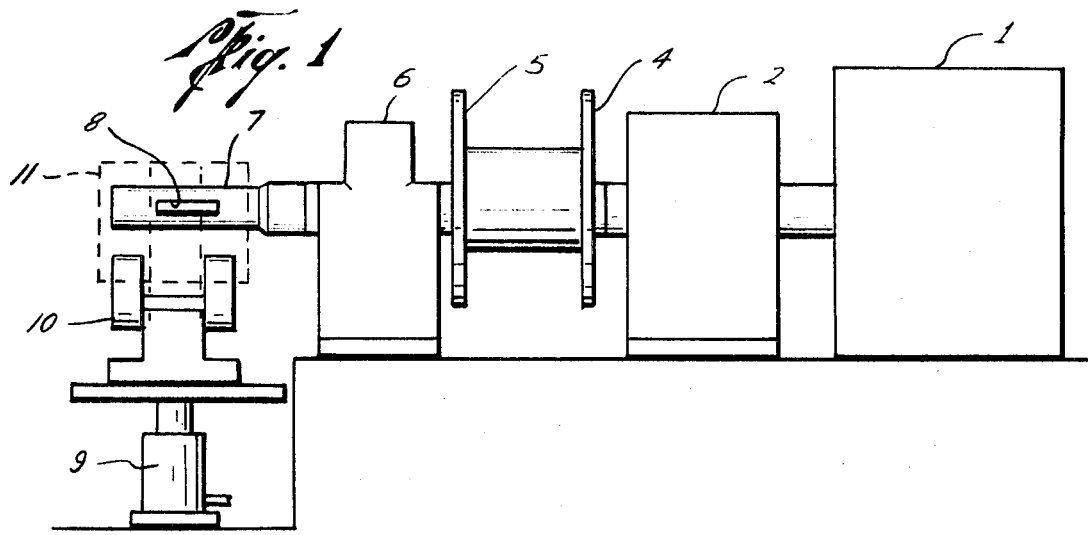
FIG. 1 is a side elevational plan view of the pipe rotating means.

In the drawings the numeral 1 designates a power unit, such as a truck transmission power take off, which rotates a power unit 2, such as a Brownline 703 power transmission unit, which in turn rotates the chain driven gears 4, 5, which in turn rotates the winch 6, which rotates the mandrel 7. An elongated slot 8 is formed in the mandrel 7 and one of a plurality of tongues, as 20, is mounted in the slot 8, the particular tongue depending upon the diameter of the pipe on which the collar is mounted. Elevating means 9 support the table 10 which in turn supports the vise 11 which is movable into gripping relation with the collar 13 when the pipe 12 is mounted on the mandrel 7.

Figure 2:
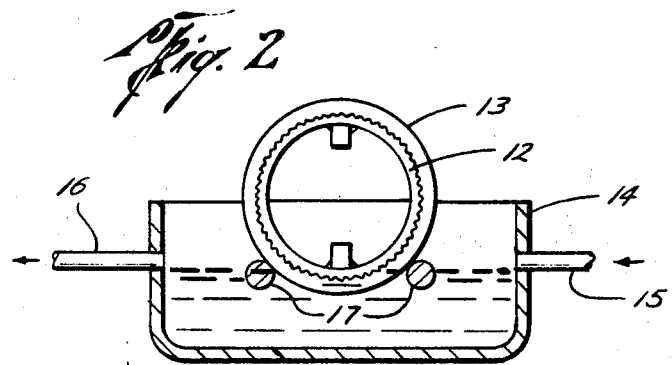
FIG. 2 is a side elevational view, in cross section, of the cooling means employed.
Figure 3:
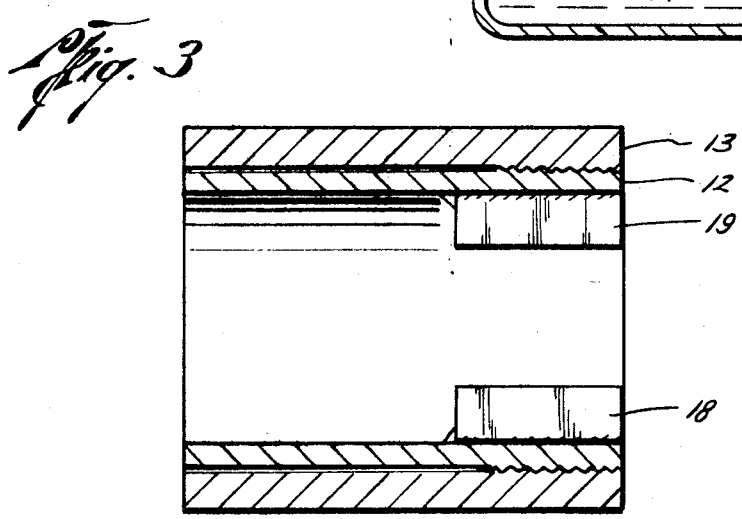
FIG. 3 is a side elevational view, in cross section, of a section of pipe with a collar attached.
Figure 4:
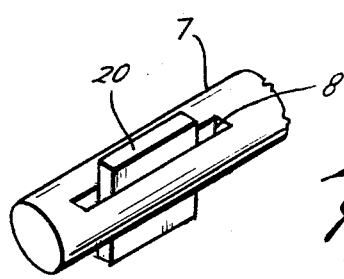
FIG. 4 is a fragmentary view of the mandrel on the rotating device, showing the mandrel and tongue in pipe rotating position.

A dutchman, meaning a section of pipe on which a collar as 13 has been mounted and cannot be readily removed, is placed in a tub 14 having the water inlet 15 and outlet 16, and is supported by the transverse rods 17, 17, said rods being mounted in the tub at a position to hold the dutchman in the tub with the water level covering a portion of the collar, as illustrated in FIG. 2. Blocks 18, 19, in diametrically opposed position in the pipe, are then welded in position with one end of the blocks forming a flush alignment with the end of the section of pipe 12. The welding is performed on one block at a time, and the collar turned to place the opposite side of the collar under water when the other block is to be welded into position in the pipe. Water is circulated through the tub during the welding process to keep the collar cool.

When the dutchman is thus prepared for removal of the collar, the pipe is placed on the mandrel 7, after the appropriate size of tongue 20 is inserted in the slot 8, with the tongue pushed to the rear end wall of the slot closest to the winch 6, and the pipe then pushed on the mandrel with the projecting ends of the tongue 20 in contact with the longitudinal side walls of the blocks 18, 19. The collar is then locked against rotation by the vise 11, which will be elevated to the proper position relative to the mandrel to maintain the pipe in coaxial relation with the mandrel. The power train is then activated, rotating the mandrel, and turning the pipe 12, and as the pipe is moved out of the collar, the tongue 20 may be moved longitudinally in the slot 8 so that the tongue 20 and blocks 18, 19 will not become bound. After the pipe has been rotated, the connection is broken, and the collar removal may usually take place manually.

What I claim is:

1. In a collar salvaging device, a rotatable mandrel, said mandrel having an elongated slot, a tongue in said slot, means for maintaining a collar against rotation while a section of pipe is being removed from said collar, means for rotating said pipe relative to said collar, and means mounted in said pipe adapted to be contacted by said tongue to impart rotation to said section of pipe.

2. The device defined in claim 1 wherein said tongue is free to move longitudinally in said slot.

3. The device defined in claim 1 wherein blocks are welded to the inner surface of said section of pipe to form the means to be contacted by said tongue.

* * * * *